US012769142B2

(12) United States Patent
Sornborger

(10) Patent No.: US 12,769,142 B2
(45) Date of Patent: Oct. 20, 2026

(54) DUAL-GRATING SPECTRAL BEAM COMBINER

(71) Applicant: Attalon Solutions, Inc., Bloomfield, CT (US)

(72) Inventor: Nathan Sornborger, Harwinton, CT (US)

(73) Assignee: Attalon Solutions, Inc., Bloomfield, CT (US)

( * ) Notice: Subject to any disclaimer, the term of this patent is extended or adjusted under 35 U.S.C. 154(b) by 385 days.

(21) Appl. No.: 18/450,696

(22) Filed: Aug. 16, 2023

(65) Prior Publication Data

US 2024/0061265 A1 Feb. 22, 2024

Related U.S. Application Data

(60) Provisional application No. 63/399,365, filed on Aug. 19, 2022.

(51) Int. Cl.
*G02B 27/10* (2006.01)
*G02B 27/09* (2006.01)
(Continued)

(52) U.S. Cl.
CPC ..... *G02B 27/1006* (2013.01); *G02B 27/0944* (2013.01); *G02B 27/0966* (2013.01); *G02B 27/30* (2013.01); *G02B 27/4277* (2013.01)

(58) Field of Classification Search
CPC ............ G02B 27/1006; G02B 27/0944; G02B 27/0966; G02B 27/30; G02B 27/4277
(Continued)

(56) References Cited

U.S. PATENT DOCUMENTS 7,535,631 B2 5/2009 Brown et al.
8,179,594 B1 5/2012 Tidwell et al.
(Continued)

FOREIGN PATENT DOCUMENTS

CN 106684702 A 5/2017

OTHER PUBLICATIONS

Fitzmaurice, (1991). "Optical Communication for Space Missions," NASA, 3109(2):249-258.
(Continued)

*Primary Examiner* — Bumsuk Won
*Assistant Examiner* — Mitchell T Oestreich
(74) *Attorney, Agent, or Firm* — McDonnell Boehnen Hulbert & Berghoff LLP

(57) ABSTRACT

A dual-grating spectral beam combiner includes a series of sources emitting a respective series of diverging laser beams with mutually parallel center rays offset from each other in a one-dimensional array. The laser beam wavelengths are incremented monotonically across the array. A first diffraction grating receives the diverging laser beams from the sources and diffracts the diverging laser beams to form respective once-diffracted diverging beams with mutually converging center rays. A second diffraction grating is positioned where the center rays of the once-diffracted diverging beams coincide, and diffracts the once-diffracted diverging beams to form a single combined diverging laser beam consisting of twice-diffracted diverging beams. The combined diverging laser beam may be subsequently collimated. By operating the dual-grating spectral beam combiner with diverging beams, it is possible to combine a high number of laser beams while keeping the propagation path between the two gratings short without requiring narrow linewidths.

21 Claims, 10 Drawing Sheets

(51) Int. Cl.
*G02B 27/30* (2006.01)
*G02B 27/42* (2006.01)

(58) Field of Classification Search
USPC .......................................................... 359/618
See application file for complete search history.

(56) References Cited

U.S. PATENT DOCUMENTS

| | | | | |
|---|---|---|---|---|
| 8,526,110 | B1 | 9/2013 | Honea et al. | |
| 2007/0127123 | A1* | 6/2007 | Brown ............... | G02B 27/1086 359/556 |

OTHER PUBLICATIONS

Madasamy et al., (2009). "Dual-Grating Spectral Beam Combination of High-Power Fiber Lasers," IEEE Journal of Selected Topics in Quantum Electronics, 15(2):337-343.
Minott et al., (1987). "Grating Rhomb Diode Laser Power Combiner," Proc. SPIE, 756:38-48.
Treacy, (1969). "Optical Pulse Compression with Diffraction Gratings," IEEE Journal of Quantum Electronics, 5(9):454-458.
International Search Report and Written Opinion received for International Patent Application No. PCT/US2023/072293 mailed on Dec. 8, 2023, 14 pages.

* cited by examiner

DUAL-GRATING SPECTRAL BEAM COMBINER

CROSS-REFERENCE TO RELATED APPLICATION

This application claims the benefit of U.S. Provisional Application No. 63/399,365, filed Aug. 19, 2022, the entire contents of which is incorporated herein by reference.

TECHNICAL FIELD OF THE DISCLOSURE

The present invention relates to spectral beam combination, that is, the combination of multiple laser beams each characterized by a different respective wavelength. The present invention relates in particular to grating-based spectral beam combination of many laser beams, such as 5-30 laser beams, to achieve a combined beam with an average power of several kilowatts (kW), or even tens or hundreds of kW.

BACKGROUND OF THE DISCLOSURE

A variety of laser applications rely on high laser power, particularly in materials processing and laser machining. As compared to conventional materials processing/machining tools, lasers are uniquely capable of highly local energy delivery and can thus perform processing and machining tasks with greater precision than conventional tools, and in many cases also with greater speed and convenience. As such, high-power laser beams are used to, e.g., weld, cut, sinter, and harden metals in a clean, precise, and efficient fashion. These processes may benefit from average laser powers in the range of several to many kW. It may be impossible to obtain sufficient laser power from a single laser source. For example, the average power of a high-power fiber laser is typically no more than a few kW, and generally less than one kW for single-mode fiber lasers. Higher laser powers may be achieved by combining the output of several individual lasers.

Spectral beam combination utilizes a wavelength-sensitive beam combiner, such as a prism or a diffraction grating or even a series of dichroic mirrors, to combine several laser beams of different respective frequencies. The dichroic mirror technique is limited by the transmission/reflection efficiencies of the dichroic mirrors, how narrow their bandwidths can be made, as well as the available wavelengths of lasers. Spectral beam combiners based on prisms or diffraction gratings are more universal in that it is possible to combine beams of similar wavelengths, such that all input beams may be generated by the same type of laser. Conventionally, a single prism or diffraction grating is used to combine input beams of different respective frequencies by directing the input beams onto the prism/diffraction grating at respective input angles that cooperate with wavelength-sensitive deflection to overlay the deflected beams on each other. The input beams may be delivered by an optical fiber array. An optical fiber array is a bundle of optical fiber ends arranged in a one-dimensional array, with all fiber ends facing nominally in the same direction.

Grating-based spectral beam combination can achieve higher laser powers than prism-based spectral beam combination, although the damage threshold of the diffraction grating(s) is ultimately a limiting factor. In one type of grating-based spectral beam combination, an optical fiber array directs a linear array of parallel-propagating, diverging laser beams to a common transform mirror or lens. The transform mirror/lens (a) directs all input beams to a common location on a diffraction grating, (b) collimates each input beam, and (c) transforms the initial transverse offsets between the input beams to corresponding differences in incidence angle onto the diffraction grating. With proper selection of wavelengths, initial transverse offsets, lens/mirror focal length, and diffraction grating properties, the input beams are combined into a single output beam with multiple co-propagating spectral components. The beam quality of the combined laser beam is sensitive to the linewidth of the input beams because the spectral content of each input beam results in angular spread of the corresponding diffracted beam. This issue can be overcome by using laser beams of narrow linewidth. Generating high-power input beams with narrow linewidth is, however, a challenge. In the case of fiber lasers, non-linearities effectively limit power as the linewidth is narrowed.

A dual-grating spectral beam combiner has been proposed by, e.g., Peter O. Minott, James B. Abshire, "Grating Rhomb Diode Laser Power Combiner," Proc. SPIE 0756, Optical Technologies for Space Communication Systems, (3 Jun. 1987); doi: 10.1117/12.940022, which presents a work-around to the linewidth requirement. A one-dimensional array of collimated, parallel-propagating input beams is directed to a first one of two reflective diffraction gratings. Each input beam has a different wavelength. The diffracted beams therefore propagate away from the first diffraction grating at different respective angles. Diffraction by the first diffraction grating converts inter-beam spectral dispersion to inter-beam angular dispersion. The positions of the input beams and their wavelengths are selected such that the diffracted beams meet at a single downstream location. The second diffraction grating is positioned at this location. Diffraction by the second grating imposes an angular dispersion that is equal and opposite to the angular dispersion imposed by the first grating. Therefore, all beams have the same propagation direction away from a common location on the second grating, resulting in the beams being overlayed on each other. Notably, for each individual input beam, any angular spread introduced by the first grating from spectral content of the beam is canceled by the second grating. This dual-grating approach can therefore produce a combined beam with good beam quality from broader-linewidth input beams, such as those generated by high-power fiber lasers.

One drawback to the dual-grating spectral beam combiner proposed by Minott and Abshire is that combination of more than a small number of input beams is impractical. Where the beams combine on the second diffraction grating, the beams must have at least a certain minimum size in order to stay below the damage threshold of the second diffraction grating and also avoid thermal aberrations. Since (a) each laser beam propagates through the combiner as a collimated beam and (b) the laser beams must be mutually parallel when incident on the first diffraction grating, the input beam size must have at least this minimum size. Because the input beams further must be spatially separate from each other on the first diffraction grating, only a limited number of input beams can be lined up next to each other while working with a first diffraction grating of a reasonable size.

SUMMARY OF THE DISCLOSURE

Disclosed herein are dual-grating spectral beam combiners that, contrary to conventional wisdom, operate with diverging laser beams and can combine a large number of laser beams with reasonably sized diffraction gratings and a relatively short propagation distance between the two diffraction gratings. Herein, a diverging laser beam refers to a laser beam that is allowed to propagate beyond its Rayleigh range. A one-dimensional array of sources is arranged to emit a corresponding one-dimensional array of diverging laser beams, each of a different wavelength. The diverging laser beams propagate toward a first diffraction grating. Diffraction by the first diffraction grating directs the diverging laser beams to a common location on a second diffraction grating. The second diffraction grating imposes an angular dispersion that is equal and opposite to the angular dispersion of the first diffraction grating. Diffraction by the second grating thereby results in the combination of the initially separate, diverging laser beams into a single diverging laser beam. This combined laser beam may subsequently be collimated or focused.

According to conventional wisdom, proper functioning of a diffraction grating requires that the input laser beam is collimated. When considering diffraction of a diverging beam in a ray picture, the different rays of the diverging beam span a range of incidence angles on a diffraction grating. This range of incidence angles affects the corresponding diffraction angles in a manner that non-trivially changes the divergence properties of the diffracted beam. Therefore, conventional grating-based spectral beam combiners collimate the laser beams before diffraction. However, we have realized that, when using two diffraction gratings imposing equal and opposite dispersion, the second diffraction grating cancels the divergence-induced angle "errors" introduced at the first diffraction grating, such that the twice-diffracted beam has the original divergence properties. However, depending on the particular configuration of the presently disclosed combiners, aberrations may arise due to a modified beam shape at the second diffraction grating. We have found that corrections can be made to reduce these aberrations, if deemed necessary.

Two significant disadvantages afflict the dual-grating beam combiners operating with collimated beams, as disclosed by Minott and Abshire. Each of these two disadvantages stem from the facts that, with collimated beams, (a) the beams must be spatially separate from each other on the first diffraction grating, and (b) the size of each individual beam on the first diffraction grating must be the same as the size of the combined beam on the second diffraction grating where a large beam size is needed to avoid damage or thermal aberrations. One resulting disadvantage is that only a few beams can fit on a first diffraction grating of reasonable size. Another resulting disadvantage is that, in the most typical application scenarios where the wavelength differences between the input beams are relatively small, the propagation distance between the first and second diffraction gratings must be very large, for example several meters. The combiners disclosed herein overcome each of these two disadvantages, while maintaining the capability to combine broad-linewidth laser beams. A trade-off may exist in the form of a slight reduction in beam quality of the combined laser beam. These reductions are notably smaller than the reductions observed in comparable single-grating combiners.

In one aspect, a dual-grating spectral beam combiner includes a series of sources configured to emit a respective series of diverging laser beams with mutually parallel center rays offset from each other in a one-dimensional array. Each diverging laser beam has a respective center wavelength. The center wavelengths are incremented monotonically across the array. The dual-grating spectral beam combiner further includes first and second diffraction gratings. The first diffraction grating is arranged to receive the diverging laser beams from the sources and diffract the diverging laser beams into an n'th diffraction order, with respect to the first diffraction grating, so as to form respective once-diffracted diverging beams with mutually converging center rays. The second diffraction grating is positioned where the center rays of the once-diffracted diverging beams coincide. The second diffraction grating is arranged to diffract the once-diffracted diverging beams into an m'th diffraction order, with respect to the second diffraction grating, so as to form a single combined diverging laser beam consisting of twice-diffracted diverging beams with mutually parallel center rays.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE DISCLOSURE

Figure 1:
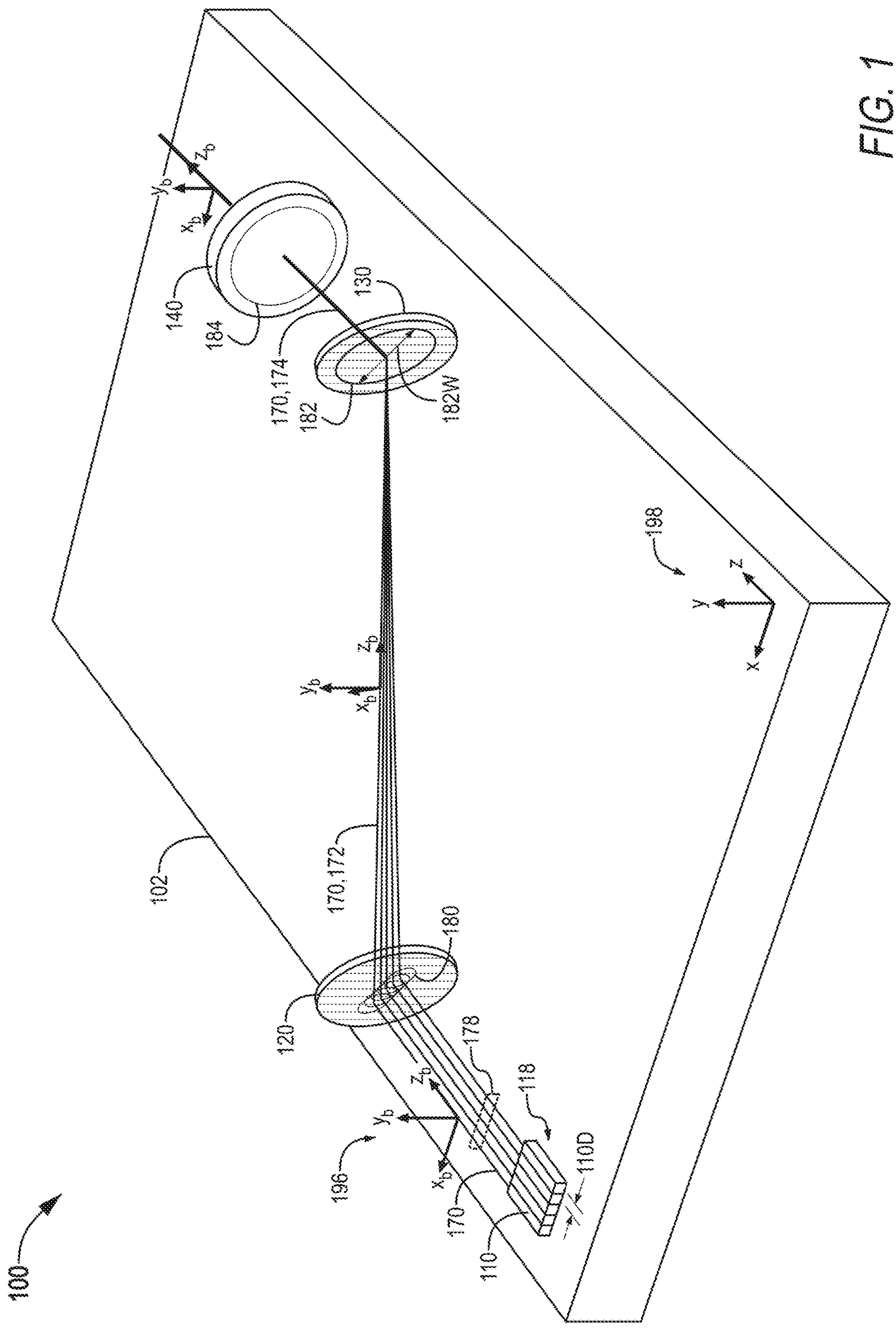
FIG. 1 illustrates a dual-grating spectral beam combiner that uses two transmission gratings to combine a plurality of fully diverging laser beams, according to an embodiment.

Referring now to the drawings, wherein like components are designated by like numerals, FIG. 1 illustrates one dual-grating spectral beam combiner 100 that uses two transmission gratings to combine a plurality of fully diverging laser beams. Combiner 100 includes a series of sources 110, two transmission gratings 120 and 130, and a post-diffraction collimator 140. Sources 110, gratings 120 and 130, and collimator 140 may be mounted on a planar substrate 102. Substrate 102 serves as a visual reference in FIG. 1 and is parallel to the xz-plane of a cartesian coordinate system 198. Herein, any reference to x-, y-, and z-axes, dimensions, directions, planes, etc. refers to coordinate system 198. The xz-plane is horizontal, and the y-axis is vertical. Herein, the terms “horizontal” and “vertical” refer to two orthogonal directions without implying a particular orientation with respect to gravity.

Sources 110 are arranged in a one-dimensional array 118. The output of each source 110 is horizontally offset from that of the adjacent source(s) 110 at least in the x-dimension. This x-dimension offset is indicated as distance 110D in FIG. 1. Distance 110D may be constant or vary across array 118. The number of sources 110 may be different from the five sources 110 depicted in FIG. 1. Combiner 100 may include two or more sources 110, for example between two and thirty sources 110. Sources 110 emit a bundle of respective diverging laser beams 170 in the positive z-direction. (Not all sources 110 and beams 170 are labeled in FIG. 1.) The general propagation of beams 170 is represented by their respective center rays in FIG. 1. The center rays may follow the directions of the Poynting vectors of beams 170. The beam divergence is indicated only by schematic $1/e^2$ outlines 180, 182, and 184 of the beams on grating 120, grating 130, and collimator 140, respectively. Sources 110 emit beams 170 with mutually parallel center rays. The center rays of beams 170 are offset from each other in a one-dimensional array 178 that is parallel to the xz-plane. Each beam 170 has a different respective center wavelength. The center wavelength is incremented monotonically across array 178. The center wavelength increases in the positive x-direction. Although not shown in FIG. 1, sources 110 may also be longitudinally offset from each other, that is, offset from each other in the z-direction.

Grating 120 receives beams 170 from sources 110 and diffracts beams 170 into an n’th diffraction order with respect to grating 120, for example a first diffraction order. Beams 170 thereafter propagate away from grating 120 as once-diffracted diverging beams 172. The grating lines of grating 120 are vertical, such that beams 170 are diffracted horizontally, and the center rays of once-diffracted beams 172 propagate in a horizontal plane. Grating 120 diffracts each beam 170 by a different diffraction angle. The positions and wavelengths of sources 110 are selected such that the angular dispersion imposed by grating 120 causes the center rays of once-diffracted beams 172 to converge after grating 120 and coincide at a single, common location.

Grating 130 is positioned where the center rays of once-diffracted beams 172 coincide. Grating 130 diffracts once-diffracted beams 172 into an m'th diffraction order with respect to grating 130, for example a first diffraction order. The grating lines of grating 130 are vertical, such that grating 130 diffracts once-diffracted beams 172 horizontally. Grating 130 is parallel to grating 120 and configured to impose an angular dispersion that is equal and opposite to the angular dispersion imposed by grating 120. Grating 130 thereby cancels the angular dispersion imposed by grating 120, and all center rays of the now twice-diffracted diverging beams have the same propagation direction away from grating 130. Since the center rays of the twice-diffracted beams are co-located on grating 130, this results in the combination of beams 170 into a single combined beam 174. In one embodiment, gratings 120 and 130 have identical periodicity, the n’th diffraction order with respect to grating 120 is the same diffraction order as the m'th diffraction order with respect to 130. For example, the n’th and m'th diffraction orders may be first diffraction orders. It follows that gratings 120 and 130 may have the same Littrow angle.

Each of gratings 120 and 130 may diffract portions of beams 170 into other diffraction orders. These portions will not be combined into combined beam 174 and may be considered lost. Most commercially available gratings are designed to achieve maximum diffraction efficiency, into the intended diffraction order and for a design wavelength, at the Littrow angle. Therefore, to minimize loss of power into other diffraction orders, gratings 120 and 130 may be oriented close to the Littrow angle with respect to the n’th and m'th diffraction orders, respectively. For example, gratings 120 and 130 may be within two degrees of Littrow angle for each of beams 170. Advantageously, since gratings 120 and 130 are transmission gratings, the Littrow configuration can be achieved without any added complexity. Due to the wavelength differences between beams 170, gratings 120 and 130 cannot be exactly at the Littrow angle for all beams. In one embodiment, gratings 120 and 130 are oriented at the Littrow angle for a wavelength that is within the range of wavelengths spanned by beams 170.

FIG. 1 shows a local cartesian coordinate system 196 that propagates with the center ray of each beam 170. Coordinate system 196 has orthogonal axes $x_b$, $y_b$, and $z_b$. Herein, any reference to $x_b$-, $y_b$-, and $z_b$-axes, dimensions, directions, planes, etc. refers to coordinate system 196. For clarity of illustration, coordinate system 196 is indicated only for one beam 170. The center ray of each beam 170 propagates in the positive $z_b$-direction. Beams 170 are fully diverging (that is, diverging in both the $x_b$-dimension and the ye-dimension) from sources 110 through both grating 120 and grating 130. The divergence angle is, for example, in the range between 3 and 50 milliradians (mrad) full-angle. Beams 170 may or may not overlap on grating 120. In the example depicted in FIG. 1, each beam 170 partially overlaps with each adjacent beam 170 on grating 120, as indicated by outlines 180. On grating 130, where beams 170 converge, outlines 182 of beams 170 are at least approximately identical, both in terms of position and shape. The beam shapes may differ slightly due to the influence on beam divergence from the different angles of diffraction experienced by the different beams 170 at grating 120. Outlines 182 on grating 130 are larger than outlines 180 on grating 120. Beam divergence continuous in combined beam 174 until reaching collimator 140 (see outline 184).

Collimator 140 may be a single lens (as shown in FIG. 1), a series of lenses, a curved mirror, or a series of curved mirrors. Collimator 140 at least approximately collimates combined beam 174. Aberrations may lead to slight deviations from perfect collimation. Aberrations may also cause the beam shape of combined beam 174 to be slightly different from the original shape of beams 170 as delivered by sources 110.

In certain embodiments, each source 110 is an optical fiber or a fiber terminator that receives laser radiation from a laser not shown in FIG. 1. In one such embodiment, beams 170 propagate through gratings 120 and 130 with the raw divergence angle defined by the fiber type and geometry. In another such embodiment, each source 110 includes one or more lenses that modify the raw divergence angle to achieve another, more beneficial divergence angle. Beams 170 may be continuous-wave or pulsed beams.

Combiner 100 is designed to be capable of producing combined beam 174 with a high average power, for example in the range between 10 and 150 kW. Such high powers impose a requirement to a minimum size of beams 170 on grating 130, where all beams 170 converge, in order to avoid optical damage to grating 130 as well as thermal aberrations of beams 170 caused by excessive heating of grating 130. For many practical implementations, this means that the transverse dimensions (e.g., as indicated by horizontal width 182W of outline 182) must be substantial, for at least one centimeter (cm). A key advantage of combiner 100 is that distances 110D between outputs of adjacent sources 110 may be much smaller than the required beam size on grating 130. In fact, the transverse x-axis extent of the entire array 118 may be similar to or less than width 182W. (The smallest acceptable separation between sources 110 may be influenced by a need to limit overlap between beams 170 on grating 120 in order to avoid optical damage and thermal aberrations at grating 120.) In one example, between 5 and 15 fiber terminators together have a total x-axis extent of between 1 and 10 cm, while width 182W is in the range between 1 and 4 cm. By virtue of sources 110 spanning only a relatively small x-axis extent, the propagation path between gratings 120 and 130 may be relatively short, even when the wavelength differences between beams 170 are relatively small. In one example, combiner 100 combines eight beams 170, having wavelengths ranging from 1030 to 1080 nanometers (nm) and a divergence angle of at least 3 mrad full angle, with less than one meter propagation distance between gratings 120 and 130. If, instead, the beams needed to be individually collimated before grating 120, this same set of beams would require a propagation distance of about 8 meters between gratings 120 and 130. As evident from this example, combiner 100 allows for a far more compact solution.

As compared to a dual-grating spectral beam combiner operating with collimated beams, the divergence of beams 170 in combiner 100 reduces the sensitivity to thermal expansion of gratings 120 and 130 caused by the laser power incident thereon. Thermal expansion of gratings 120 and 130 increases the distance between grating lines, thus causing a diffraction angle error. Due to the divergence of beams 170, the local heat loads on gratings 120 and 130 may be more similar than when operating with collimated beams, such that the diffraction angle error introduced at grating 120 is at least partly canceled by the diffraction angle error introduced at grating 130. It may therefore be possible to subject grating 130 to a higher power density than the second grating of a dual-grating spectral beam combiner operating with collimated beams.

At least grating 130 is located beyond the Rayleigh range of each beam 170. It is possible, but typically less advantageous, to position grating 120 within the Rayleigh range of one or more beams 170. Implementations where grating 120 is within the Rayleigh range of one or more beams 170 may require the transverse extent of such beams 170 to be relatively large at sources 110 in order to prevent optical damage and thermally induced aberrations at grating 120. When grating 120 is positioned beyond the Rayleigh range of each beam 170, sources 110 can be made more compact and the substantial divergence of beams 170 between sources 110 and grating 120 is relied upon to prevent adverse effects at grating 120.

Figure 2A:
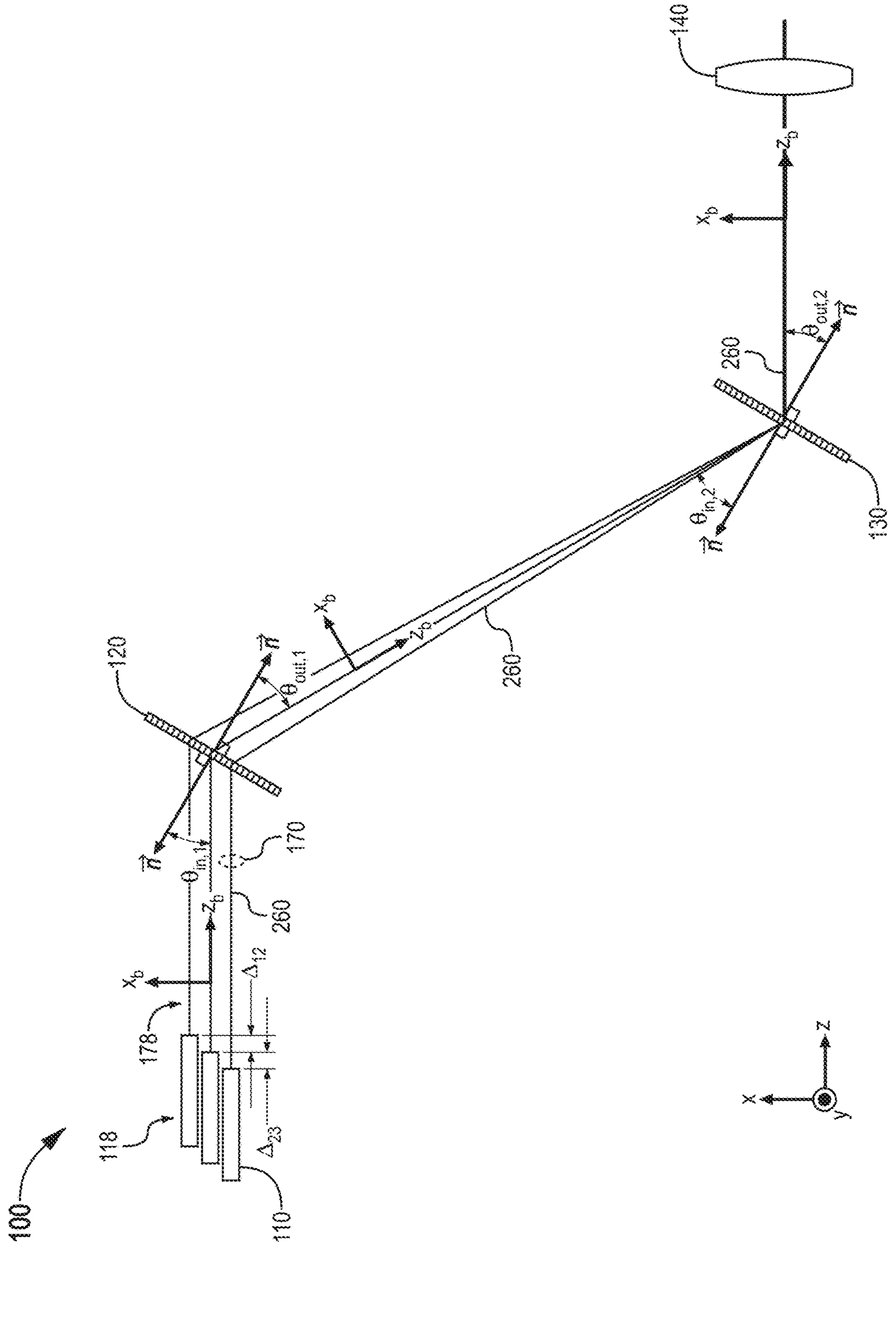
FIGS. 2A and 2B are top views of the dual-grating spectral beam combiner of FIG. 1 showing certain aspects in further detail.
Figure 2B:
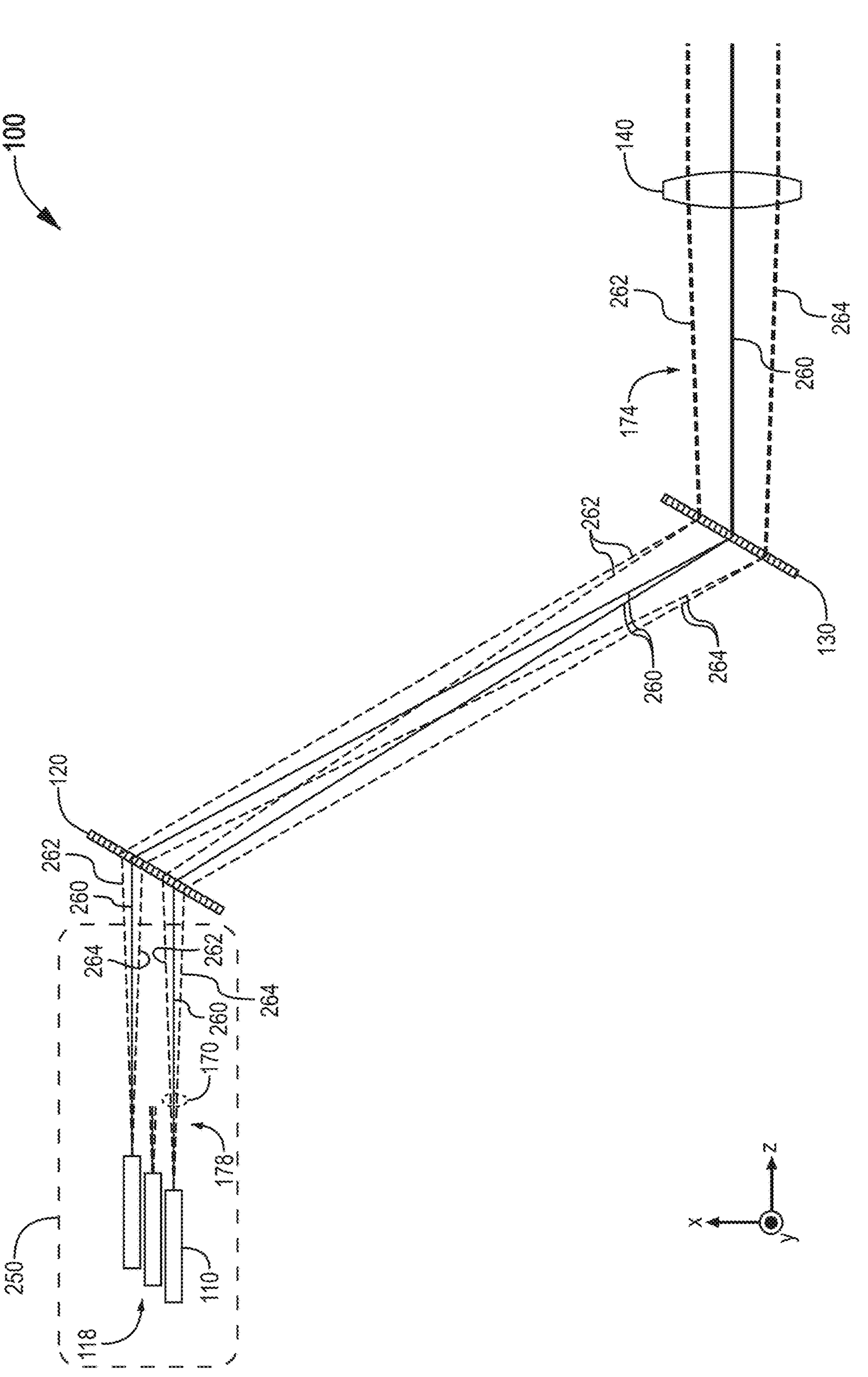

FIGS. 2A and 2B are top views of combiner 100 showing certain aspects in further detail. In the example depicted in FIGS. 2A and 2B, combiner 100 includes three sources 110, such that array 178 includes three respective beams 170. FIG. 2A shows the propagation of a center ray 260 of each of the three beams 170. FIG. 2B illustrates the divergence of beams 170. More specifically, FIG. 2B shows the propagation of center ray 260 and two peripheral rays 262 and 264 of the two outermost beams 170. Herein, a "peripheral ray" may be viewed as an approximate indicator of the $1/e^2$ level of the transverse intensity distribution of the corresponding beam. Peripheral rays 262 and 264 propagate in the horizontal plane. For clarity of illustration, rays from the middle source 110 are discontinued shortly after the source output in FIG. 2B.

As shown in FIG. 2A, gratings 120 and 130 are oriented such that their normal vectors $\vec{n}$ are horizontal. Each center ray 260 is incident on grating 120 at the same incidence angle $\theta_{in,1}$. Due to the wavelength differences between beams 170, the resulting diffraction angles $\theta_{out,1}$ of the center rays differ from each other. Accordingly, each center ray is incident of grating 130 at a different, respective incidence angle $\theta_{in,2}$. Since gratings 120 and 130 are parallel to each other, $\theta_{in,2}$ equals $\theta_{out,1}$ for each center ray 260. Additionally, since grating 130 is configured to impose an angular dispersion that is equal and opposite to the angular dispersion imposed by grating 120, grating 130 diffracts each center ray 260 into a common diffraction angle $\theta_{out,2}$ that equals $\theta_{in,1}$.

When gratings 120 and 130 are arranged close to the Littrow angle, $\theta_{in,1}$, $\theta_{out,1}$, $\theta_{in,2}$, and $\theta_{out,2}$ are at least nearly identical. Due to the wavelength differences between beams 170, at most one of beams 170 can be incident on gratings 120 and 130 exactly at the Littrow angle. However, when the wavelength differences between beams 170 are relatively small, the deviations from the Littrow angle may be made correspondingly small.

Optionally, sources 110 are longitudinally offset from each other to eliminate or at least reduce differences, between center rays 260, in propagation distances from sources 110 to where center rays 260 coincide on grating 130. Since beams 170 diverge from sources 110 to beyond grating 130, such differences in propagation distance would result in the different beams 170 having different sizes when combined in combined beam 174. In the depicted example with three sources 110, sources 110 are longitudinally offset from each other by distances $\Delta_{12}$ and $\Delta_{23}$. Depending at least on the transverse offsets between the outputs of sources 110 (see offset distances 110D in FIG. 1), $\Delta_{12}$ and $\Delta_{23}$ may or may not have the same magnitude. Particularly in implementations with many sources 110, sources 110 may be arranged in groups, with longitudinal offsets between groups but no longitudinal offsets within groups.

Considering now the peripheral rays 262 and 264 shown in FIG. 2B, these peripheral rays undergo diffraction at gratings 120 and 130 similar to the diffraction of center rays 260. The incidence angles and diffraction angles are different from those pertaining to center rays 260. Yet, as is the case for center rays 260, each peripheral ray 262 and each peripheral ray 264 propagates away from grating 130 at a respective diffraction angle that matches the corresponding incidence angle on grating 120. With appropriate longitudinal offsets between sources 110, all peripheral rays 262 coincide at grating 130, and all peripheral rays 264 coincide at grating 130, as depicted in FIG. 2B. With such longitudinal offsets, all beams 170 have the same size when combined in combined beam 174. Without longitudinal offsets, different spectral components of combined beam 174 will have slightly different sizes, which may be acceptable in some scenarios. For example, in embodiments of combiner 100 having only a small number of sources 110, e.g., 4 or fewer, and only small transverse offset distances 110D between sources 110, it may be acceptable for sources 110 to be arranged with zero longitudinal offset.

Figure 3:
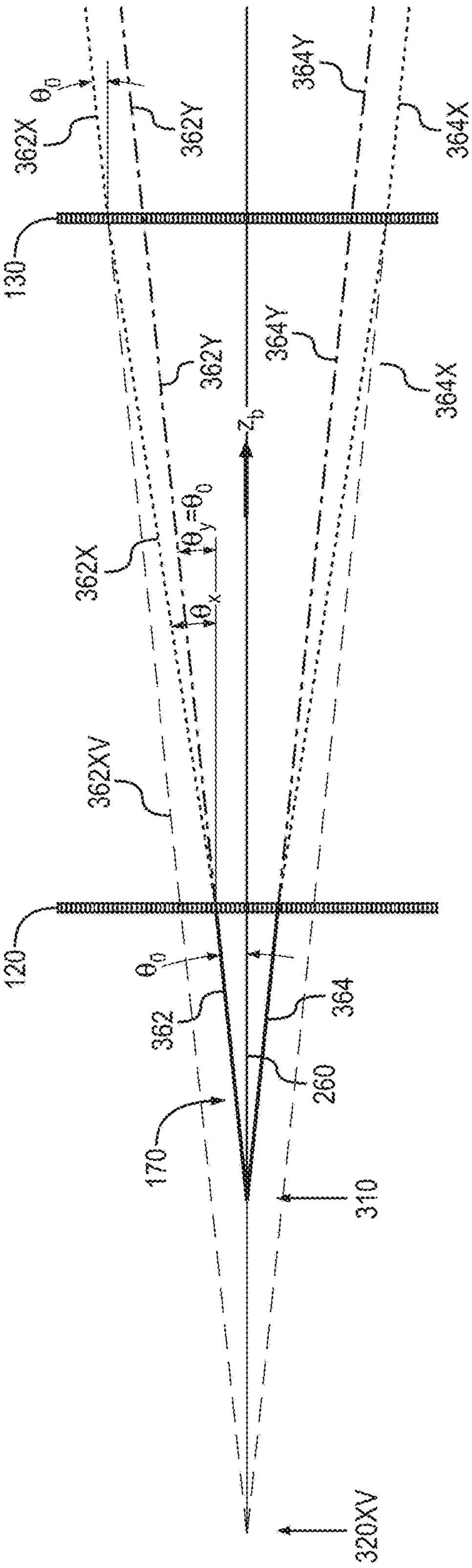
FIG. 3 investigates astigmatism properties of the dual-grating spectral beam combiner of FIG. 1.

FIG. 3 investigates astigmatism properties of combiner 100. FIG. 3 shows, for a single beam 170, the divergence in the $x_b$- and $y_b$-dimensions from source 110 through gratings 120 and 130. For clarity of illustration, the beam deflection imposed by gratings 120 and 130 is omitted, while divergence angles and angle differences are generally exaggerated. An arrow indicates the location 310 of the beam waist, e.g., the output of an optical fiber delivering beam 170. It is assumed that beam 170 is free of astigmatism before reaching grating 120. Therefore, peripheral rays 362 and 364 (thick solid lines) propagate at the original divergence angle $\theta_0$ up until grating 120, regardless of whether the peripheral rays are in the horizontal $x_bz_b$-plane or the vertical $y_bz_b$-plane or in between. The horizontal diffraction by grating 120 breaks this symmetry. Grating 120 does not affect the divergence angles of vertical-plane peripheral rays 362Y and 374Y (long-dashed short-dashed lines), which therefore propagate from grating 120 to grating 130 at a divergence angle $\theta_y$ that equals $\theta_0$. Horizontal-plane peripheral rays 362X and 364X (short-dashed lines), on the other hand, are affected by diffraction and propagate at a greater divergence angle $\theta_x$. After grating 130, both horizontal-plane peripheral rays 362X and 364X and vertical-plane peripheral rays 362Y and 364Y again propagate at the original divergence angle $\theta_0$. Still, the relatively faster expansion of the $x_b$-dimension between gratings 120 and 130 results in an asymmetric transverse beam profile at grating 130.

Figure 4:
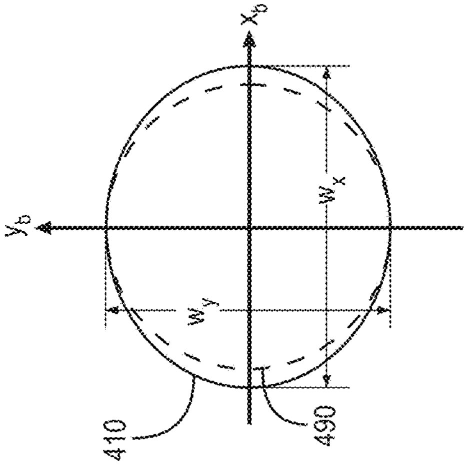
FIG. 4 shows an exemplary asymmetric transverse beam profile of a laser beam at the second grating of the dual-grating spectral beam combiner of FIG. 1.

FIG. 4 shows an asymmetric transverse beam profile 410 of beam 170 at grating 130 corresponding to the propagation illustrated in FIG. 3. A dashed circle 490 is included as a visual reference. Beam profile 410 has a horizontal $1/e^2$ width $w_x$ and a vertical $1/e^2$ width $w_y$. Width $w_x$ exceeds width $w_y$.

Referring now to FIGS. 3 and 4 in combination, peripheral rays 362X and 364X are width $w_x$ apart on grating 130, whereas peripheral rays 362Y and 364Y are only the lesser width $w_y$ apart. Therefore, rays 362X and 364X can be traced backwards in FIG. 3 via respective virtual rays 362XV and 364XV (long-dashed lines) to a virtual focus 310XV that is more distant than the waist location 310 pertaining to peripheral rays 362Y and 364Y. Consequently, a spherically-symmetric collimator cannot collimate both the $x_b$- and $y_b$-dimension of beam 170. Thus, in certain embodiments, collimator 140 (depicted in FIG. 1) has different focusing powers in the horizontal and vertical dimensions. For example, collimator 140 may be a toric lens or mirror.

Alternatively, collimator 140 is a spherically-symmetric collimator, and the astigmatism introduced in combiner 100 is at least partly corrected by rotating either one of gratings 120 and 130 about a vertical axis. Thus, in a modification of combiner 100, gratings 120 and 130 are not exactly parallel. Instead, one of gratings 120 and 130 is rotated, about a vertical axis, relative to the orientation of the other one of gratings 120 and 130, such that the respective normal vectors of gratings 120 and 130 are at a non-zero angle to each other. It may be sufficient to rotate the selected grating by about one degree, for example between 0.5 and 6 degrees. This rotation causes the twice-diffracted beams to have slightly different propagation directions.

Instead of correcting astigmatism, combiner 100 may be modified in a manner that avoids introducing astigmatism, namely by collimating the vertical dimension, i.e., the y-dimension, of beams 170 prior to diffraction. In such embodiments, beams 170 still diverge in the horizontal dimension. Therefore, the benefits resulting from diverging beams, as discussed above, are maintained. Pre-diffraction vertical collimation entails (a) adding a pre-diffraction collimation module in the section of combiner 100 that precedes grating 120, indicated in FIG. 2B as section 250, and (b) replacing collimator 140 with a post-diffraction horizontal collimator that collimates only the horizontal dimension of combined beam 174, e.g., a cylindrical lens or mirror. FIGS. 5A-7B illustrate several different pre-diffraction vertical collimation schemes that may be implemented in section 250 of these modified embodiments of combiner 100. In each of these schemes, the vertical dimensions of beams 170 are expanded before being collimated. The expansion ensures that the horizontal and vertical dimensions of combined beam 174 are identically sized, or at least similar in size, by the time the horizontal dimension is collimated by the post-diffraction horizontal collimator.

Figure 5A:
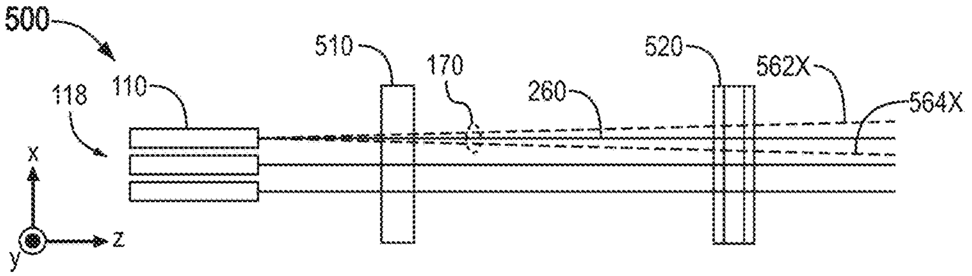
FIGS. 5A and 5B illustrate a pre-diffraction vertical collimation scheme that utilizes two cylindrical lenses, each common to all the laser beams to be combined, according to an embodiment.
Figure 5B:
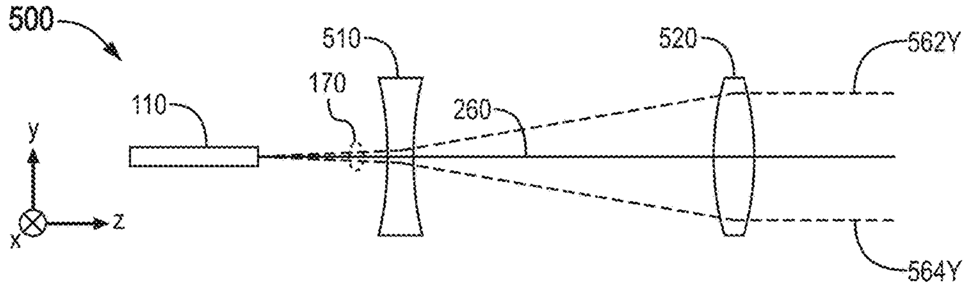

FIGS. 5A and 5B illustrate one pre-diffraction vertical collimation scheme 500 that utilizes two cylindrical lenses, each common to all beams 170. FIG. 5A is a top view of section 250 showing center ray 260 of each beam 170 and horizontal-plane peripheral rays 562X and 564X of a single beam 170. FIG. 5B is a cross-sectional view of section 250 showing the propagation of a single beam 170, as represented by its center ray 260 and two vertical-plane peripheral rays 562Y and 564Y. Scheme 500 utilizes a pre-diffraction collimation module with two cylindrical lenses 510 and 520. Lenses 510 and 520 have optical power only in the y-dimension. Lens 510 has negative optical power in the y-dimension and is arranged to expand beams 170 faster than they would with the original divergence angle from sources 110, as indicated by peripheral rays 562Y and 564Y in FIG. 5B. Lens 520 is arranged to receive beams 170 from lens 510 and collimate beams 170 in the vertical dimension. Scheme 500 lets beams 170 propagate freely in the horizontal dimension, as indicated by peripheral rays 562X and 564X in FIG. 5A.

Scheme 500 offers simplicity by only requiring two pre-collimation lenses. However, any substantial longitudinal offset between sources 110 will result in the different beams 170 having different respective divergence properties at collimator 140. Therefore, scheme 500 is best suited for embodiments without longitudinal offsets between sources 110. For embodiments of combiner 100 having longitudinal offsets between at least some of sources 110, the pre-diffraction vertical collimation schemes discussed below, in reference to FIGS. 6, 7A, and 7B, offer better performance.

Figure 6:
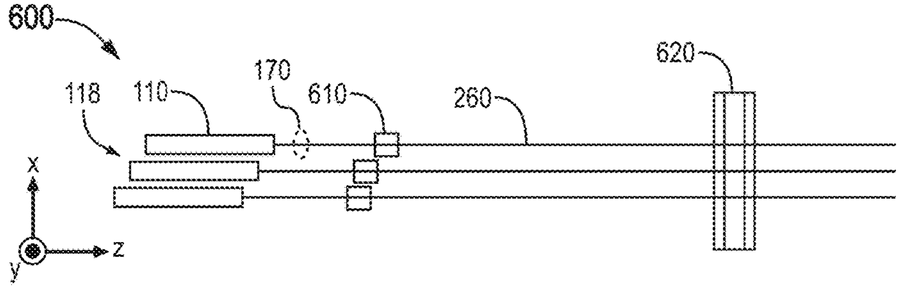
FIG. 6 is a top view of a pre-diffraction vertical collimation scheme that vertically expands each laser beam separately before vertically collimating all laser beams with a common lens, according to an embodiment.

FIG. 6 is a top view of one pre-diffraction vertical collimation scheme 600 that vertically expands each beam 170 separately before vertically collimating beams 170 with a common lens. FIG. 6 shows center rays 260 only. Scheme 600 utilizes a pre-diffraction collimation module that includes a separate cylindrical lens 610 for each beam 170, and a cylindrical collimation lens 620 that is common to all beams 170. Each beam 170 is first expanded vertically by the corresponding lens 610 and then collimated vertically by lens 620. Each lens 610 has different parameters, and lenses 610 are positioned such that all beams 170 are collimated to at least approximately the same size by lens 620, thereby eliminating or at least reducing the size discrepancies produced in scheme 500.

Scheme 600 offers higher performance than scheme 500 at the cost of added complexity. A compromise may be achieved by having several (but not all) beams 170 share a single lens 610. In implementations where sources 110 are arranged in groups, with longitudinal offsets between groups but no longitudinal offsets within groups, a separate lens 610 may be dedicated to each group.

Figure 7A:
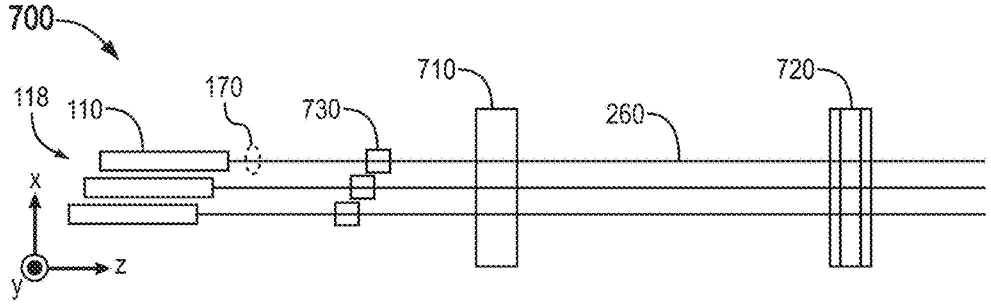
FIGS. 7A and 7B illustrate a pre-diffraction vertical collimation scheme that first collimates each laser beam separately, then vertically expands all laser beams using a common lens before vertically collimating the laser beams with another common lens, according to an embodiment.
Figure 7B:
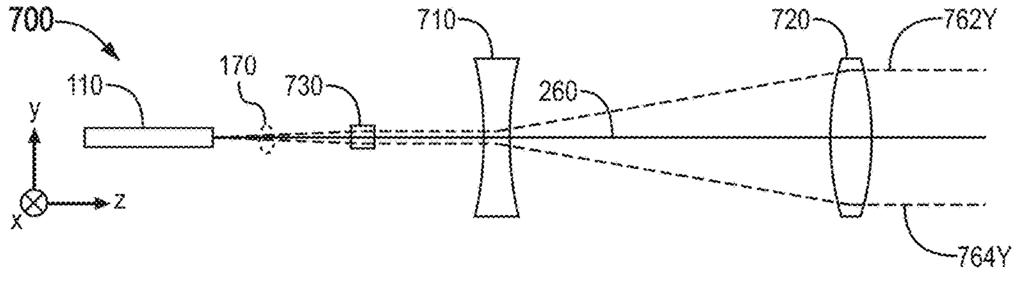

FIGS. 7A and 7B illustrate one pre-diffraction vertical collimation scheme 700 that first collimates each beam separately, then vertically expands all beams 170 using a common lens, before vertically collimating beams 170 with another common lens. Scheme 700 collimates all beams to the same vertical size, without requiring different lens parameters for different beams. FIG. 7A is a top view of section 250 showing center ray 260 of each beam 170. FIG. 7B is a cross-sectional view of section 250 showing the propagation of a single beam 170, as represented by its center ray 260 and two vertical-plane peripheral rays 762Y and 764Y.

Scheme 700 utilizes a pre-diffraction collimation module that includes a separate vertical collimation lens 730 for each beam 170, a negative-optical-power cylindrical lens 710 common to all beams 170, and a positive-optical-power cylindrical lens 720 common to all beams 170. First, each beam 170 is vertically collimated to a relatively small size by the corresponding lens 730. All lenses 730 have the same parameters and are positioned at the same distance from the corresponding sources 110 (assuming that all sources 110 have the same divergence). Therefore, lenses 730 collimate all beams 170 to the same vertical size. Next, lens 710 vertically expands beams 170, whereafter lens 720 vertically collimates beams 170 to the same vertical size. In implementations where sources 110 are arranged in groups, with longitudinal offsets between groups but no longitudinal offsets within groups, a separate lens 730 may be dedicated to each group.

Each of the cylindrical lenses in any one of pre-diffraction vertical collimation schemes 500, 600, and 700 may be replaced by an equivalent cylindrical mirror, a set of cylindrical lenses, or a set of cylindrical mirrors.

Figure 8:
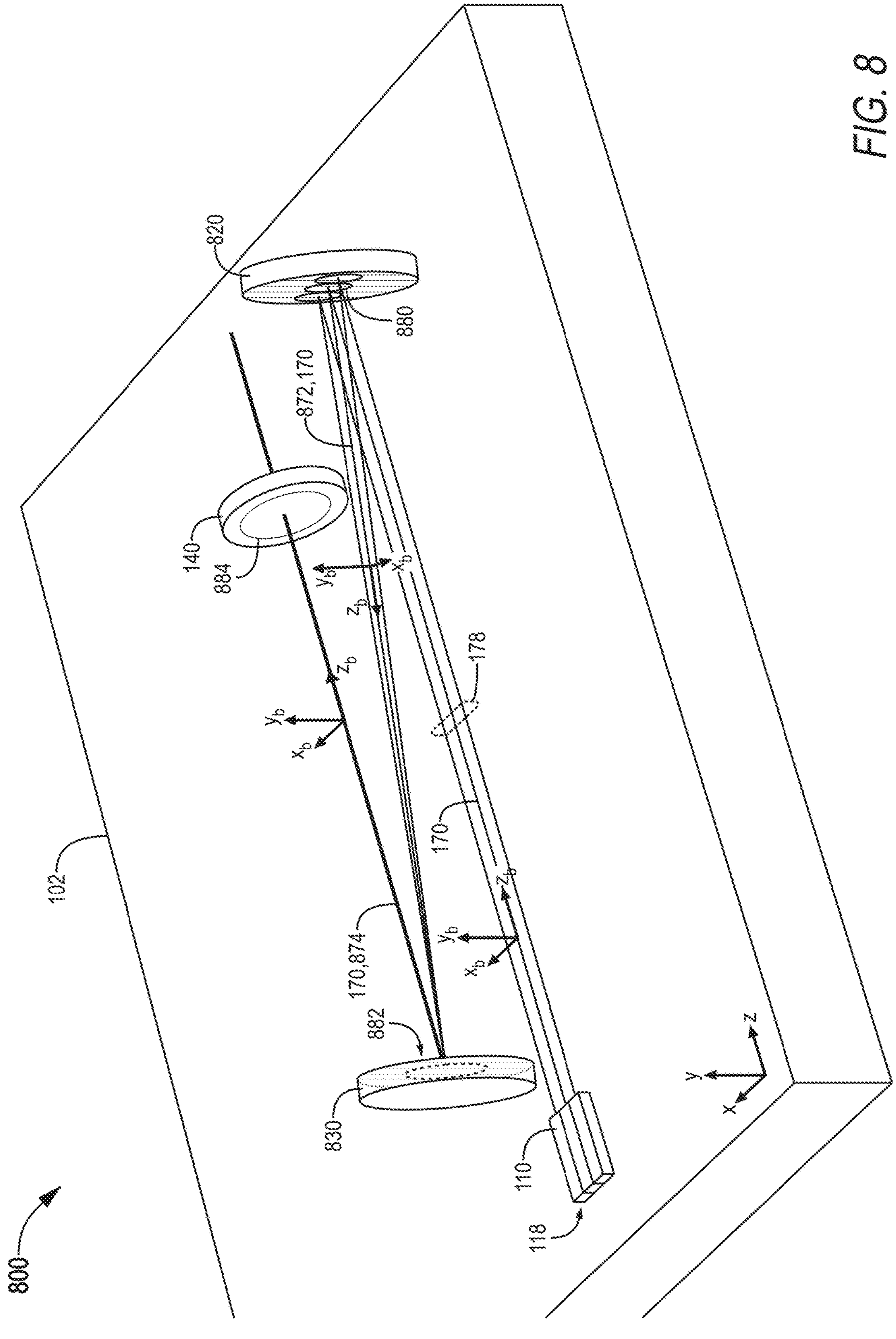
FIG. 8 illustrates a dual-grating spectral beam combiner that uses two reflection gratings to combine fully diverging laser beams, according to an embodiment.

FIG. 8 illustrates one dual-grating spectral beam combiner 800 that uses two reflection gratings 820 and 830 to combine fully diverging laser beams 170. FIG. 8 shows combiner 800 in a view similar to that used for combiner 100 in FIG. 1. Beams 170 are represented by their respective center rays, and divergence is indicated only by beam outlines 880, 882, and 884 on grating 820, grating 830, and collimator 140, respectively. Gratings 820 and 830 are oriented to deflect the beams in the plane of diffraction. Combiner 800 is similar to combiner 100 except for (a) using reflection gratings 820 and 830 rather than transmission gratings 120 and 130 and (b) the incidence/diffraction angles of gratings 820 and 830 being subject to constraints imposed by the need to deflect diffracted beams away from incident beams.

As is the case for gratings 120 and 130 in combiner 100, gratings 820 and 830 of combiner 800 have vertical grating lines and diffract beams 170 horizontally. Grating 820 receives beams 170 from sources 110 and diffracts beams 170 into an n'th diffraction order with respect to grating 820, for example a first diffraction order. Beams 170 thereafter propagate away from grating 820 as once-diffracted beams 872. Grating 830 is positioned where the center rays of once-diffracted beams 872 coincide, and diffracts once-diffracted beams 872 into an m'th diffraction order with respect to grating 830, for example a first diffraction order. Diffraction by grating 830 combines beams 170 into a single combined beam 874. Combined beam 874 is collimated by collimator 140. As discussed above for combiner 100, in reference to FIGS. 2A and 2B, longitudinal offsets may exist between at least some of sources 110 in combiner 800.

In order to separate the diffracted beams from the incident beams on each of gratings 820 and 830, the diffraction angle has to be substantially different from the incidence angle on each grating. This is a significant difference from combiner 100, where incidence angles and diffraction angle may be identical or similar. Combiner 800 therefore cannot operate as close to the Littrow angle as combiner 100. Transmission gratings, however, tend to have lower efficiencies for diffraction into a single, desired diffraction order, and more power is distributed to other orders (including the zeroth order). Not only does this result in loss but, when operating with high powers, the beams diffracted into the "wrong" diffraction orders must also be safely blocked. As compared to combiner 100, combiner 800 may therefore be more suitable for handling very high powers. In one scenario, combiner 100 is preferable for generating combined beams with an average power of up to about 50 kilowatts, whereas combiner 800 is preferable for higher combined average powers.

Figure 9A:
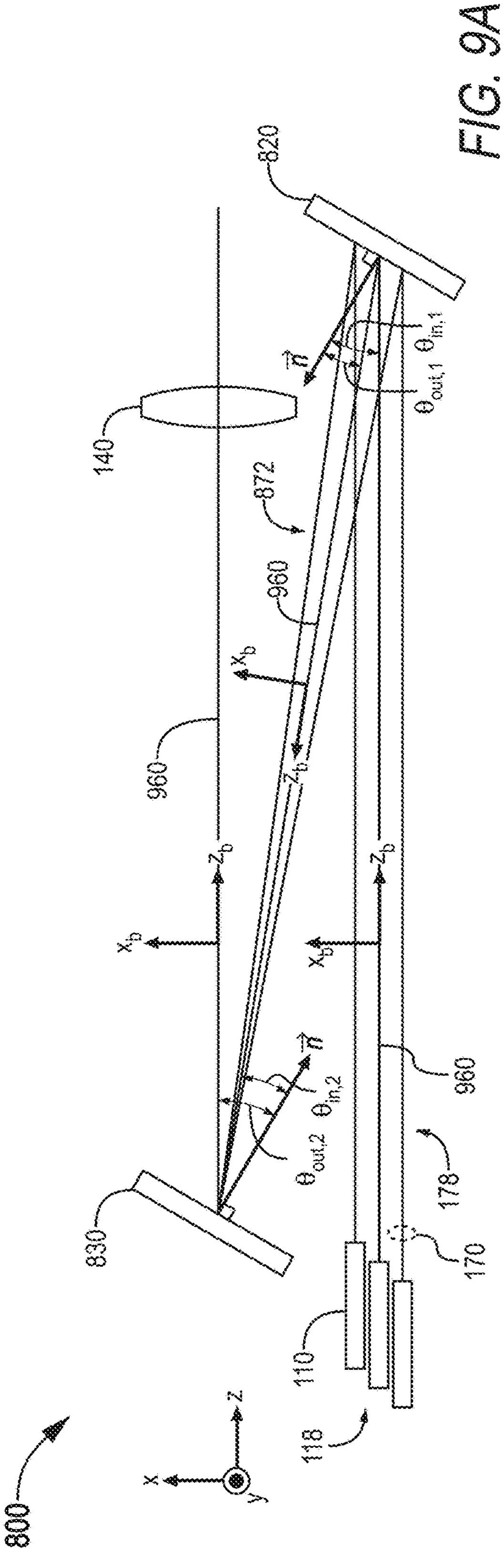
FIGS. 9A and 9B are top views of the dual-grating spectral beam combiner of FIG. 8 showing certain aspects in further detail.
Figure 9B:
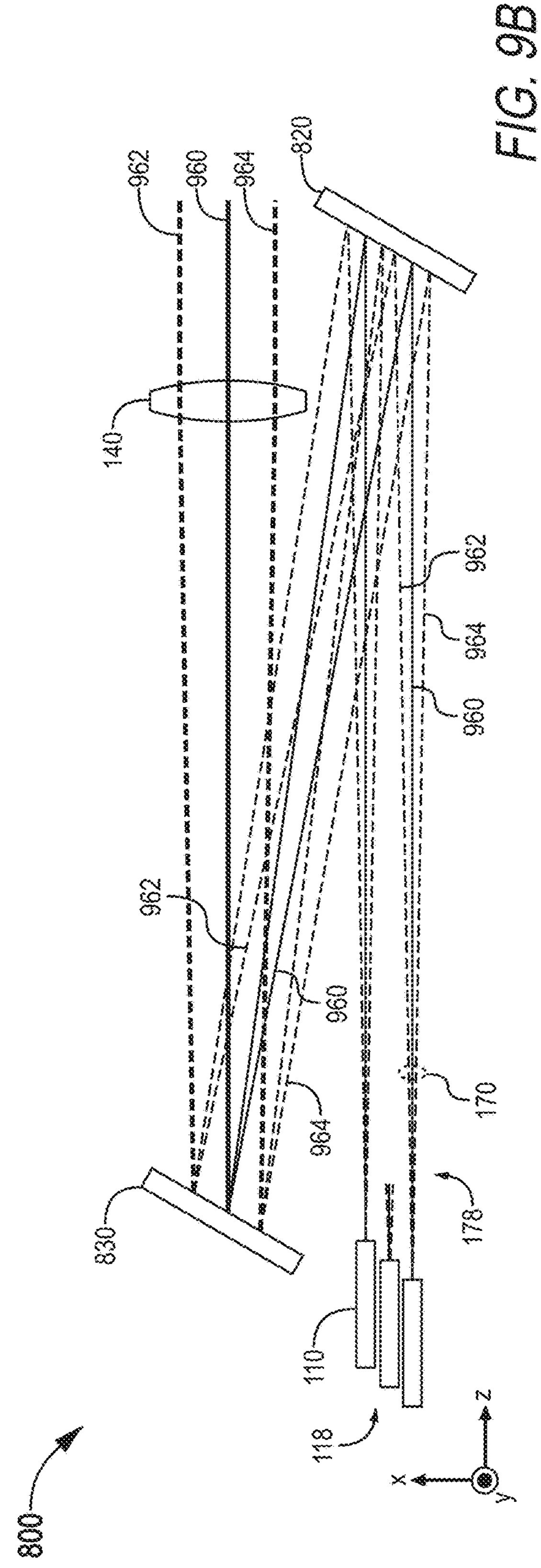

FIGS. 9A and 9B are top views of dual-grating spectral beam combiner 800, similar to the top views of combiner 100 provided in FIGS. 2A and 2B. FIG. 9A shows the propagation of a center ray 960 of each of three beams 170. FIG. 9B illustrates the divergence of beams 170, by showing the propagation of center ray 960 and two peripheral rays 962 and 964 of the two outermost beams 170. As for gratings 120 and 130 in combiner 100, the normal vectors of gratings 820 and 830 are horizontal. In order to separate once-diffracted beams 872 from the incident beams 170 on grating 820, $\theta_{out,1}$ is substantially smaller than $\theta_{out,1}$ for all beams. The necessary difference between $\theta_{out,1}$ and $\theta_{in,1}$ depends on various spatial and design constraints and may, for example, be at least two degrees. This consideration applies to $\theta_{out,2}$ and $\theta_{in,2}$ as well. Yet, by virtue of gratings 820 and 830 being parallel and imposing equal but opposite angular dispersions, $\theta_{out,2}$ equals $\theta_{in,1}$ for each beam 170.

Combiner 800 is subject to the astigmatism effects discussed for combiner 100 in reference to FIGS. 3 and 4, and combiner 800 may be similarly modified to correct for astigmatism. As such, gratings 820 and 830 may deviate slightly from being parallel, or combiner 800 may be modified to utilize pre-diffraction collimation of the vertical dimensions of beams 170 and post-diffraction collimation of the horizontal dimension of combined beam 874. For example, combiner 800 may be modified to implement any one of schemes 500, 600, and 700 discussed above in reference to FIGS. 5A-7B.

Figure 10:
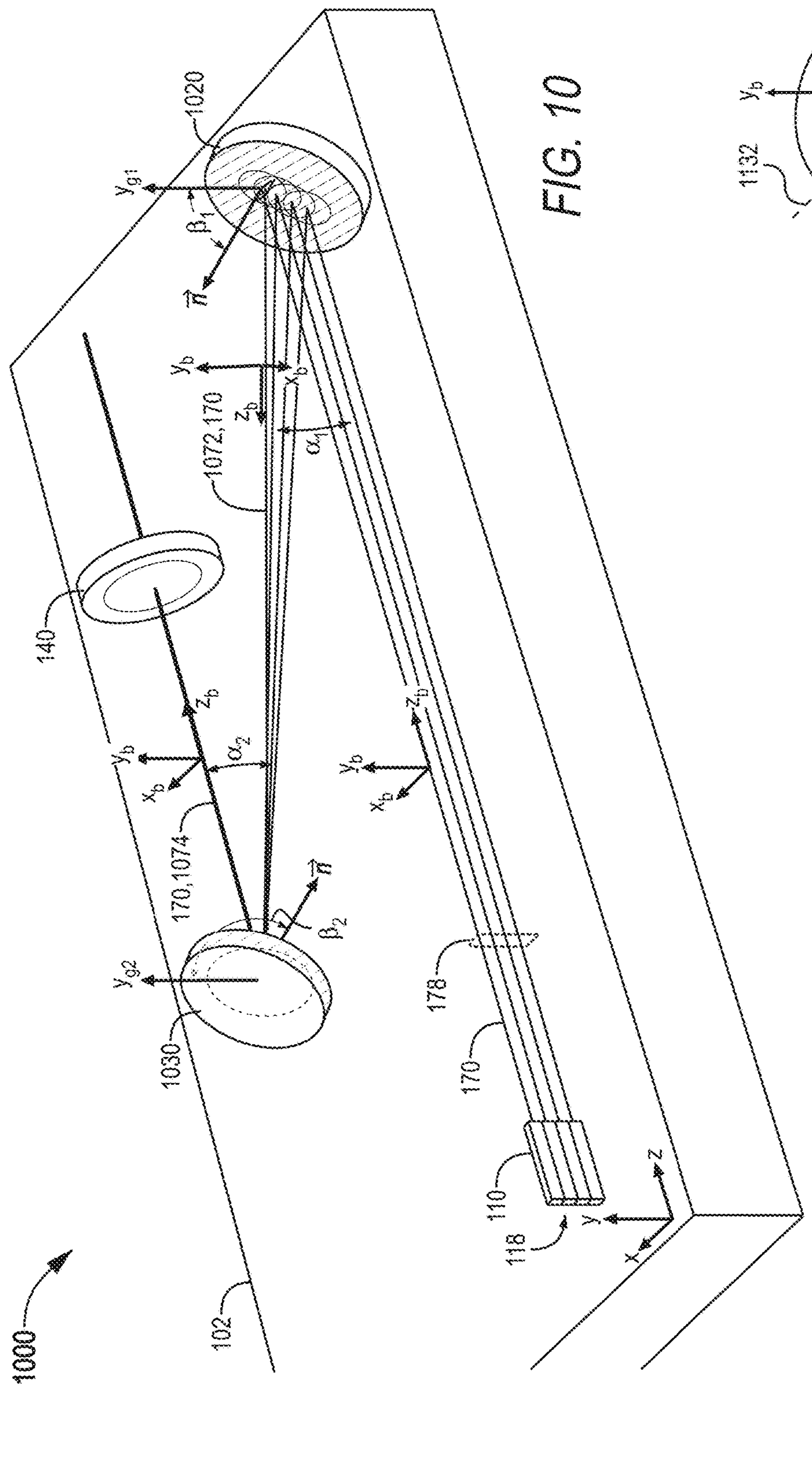
FIG. 10 illustrates another dual-grating spectral beam combiner that uses reflection gratings to combine fully diverging laser beams, accordingly to an embodiment. In order to separate diffracted beams from incident beams, the gratings deflect the beams in a plane that is orthogonal to the plane of diffraction.

FIG. 10 illustrates another dual-grating spectral beam combiner 1000 that uses reflection gratings to combine fully diverging laser beams 170. In order to separate diffracted beams from incident beams, the gratings of combiner 1000 deflect the beams in the plane that is orthogonal to the plane of diffraction. Combiner 1000 includes array 118 of sources 110, reflection gratings 1020 and 1030, and collimator 140. FIG. 10 shows combiner 1000 in a view similar to that used for combiner 800 in FIG. 8. Beams 170 are represented by their respective center rays, and divergence is indicated only by beam outlines on gratings 1020 and 1030 and on collimator 140. Combiner 1000 is similar to combiner 800 except that, whereas combiner 800 relies on diffraction to separate diffracted beams from incident beams on each grating, combiner 1000 instead achieves this separation through an orthogonal reflective deflection. Advantageously, diffraction may therefore take place at or near the Littrow angle, as in combiner 100.

Grating 1020 receives beams 170 from sources 110 and diffracts beams 170 into an n'th (e.g., first) diffraction order with respect to grating 1020. Beams 170 thereafter propagate away from grating 1020 as once-diffracted beams 1072. Grating 1030 is positioned where the center rays of once-diffracted beams 1072 coincide. Grating 1030 diffracts once-diffracted beams 1072 into an m'th (e.g., first) diffraction order with respect to grating 1030, resulting in a combined beam 1074. Collimator 140 collimates combined beam 1074.

In combiner 1000, sources 110 are stacked vertically (in contrast to the horizontal stacking of combiners 100 and 800) such that array 178 is parallel to the yz-plane. Although not shown in FIG. 10, longitudinal offsets may exist between at least some of sources 110, in the same manner and for the same reasons as discussed above for combiner 100. Grating lines of gratings 1020 and 1030 are horizontal. Thus, for each beam 170 on each of gratings 1020 and 1030, the plane of diffraction is vertical.

Considering first grating 1020, its normal vector is at an oblique angle to both the horizontal xz-plane and the vertical yz-plane. The rotation angle of grating 1020 about a local vertical axis $y_{g1}$, is set to non-diffractively deflect the center rays of once-diffracted beams 1072 by a horizontal angle $\alpha_1$ away from the center rays of beams 170 as incident on grating 1020. The projection of grating 1020's normal vector onto a horizontal plane falls halfway between once-diffracted beams 1072 and incident beams 170. The normal vector of grating 1030 is also at an oblique angle to both the horizontal xz-plane and the vertical yz-plane. The rotation angle of grating 1030 about a local vertical axis $y_{g2}$, is set to non-diffractively deflect the center ray of combined beam 1074 by a horizontal angle $\alpha_2$ away from the center rays of once-diffracted beams 1072. The projection of grating 1030's normal vector onto a horizontal plane falls halfway between combined beam 1074 and once-diffracted beams 1072.

With regards to diffraction, combiner 1000 operates similarly to combiner 100, apart from diffraction being reflective instead of transmissive. Grating 1020's normal vector is at an angle $\beta_1$ to local vertical axis $y_{g1}$. The angle between grating 1030's normal vector and local vertical axis $y_{g2}$, is $\beta_2=180°-\beta_1$, resulting in the combination of beams 170 into combined beam 1074. The non-diffractive deflection used by combiner 1000 for beam separation, is an added feature not necessary in combiner 100.

In one embodiment, gratings 1020 and 1030 are parallel such that deflection angles $\alpha_1$ and $\alpha_2$ are identical. However, combined beam 1074 may have less astigmatism if $\alpha^2$ is less than $\alpha_1$.

Figure 11:
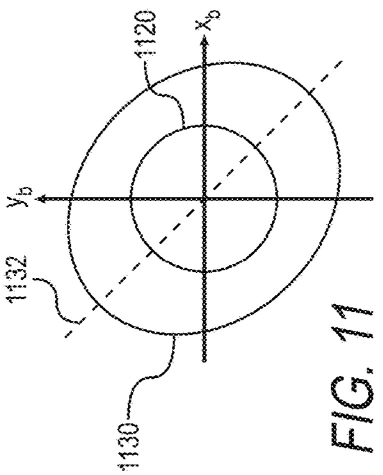
FIG. 11 is a diagram that illustrates a potential source of astigmatism in the dual-grating spectral beam combiner of FIG. 10 when deflection angles are identical for the two gratings.

FIG. 11 is a diagram that illustrates a potential source of astigmatism in combiner 1000 when angles $\alpha_1$ and $\alpha_2$ are identical. FIG. 11 depicts transverse beam profiles 1120 and 1130 in the local coordinate system of a beam 170. Profile 1120 is taken at grating 1020, and profile 1130 is taken at grating 1030. The pre-diffraction beam shape of beam 170 is assumed to be circular. Profile 1130, on the other hand, is oblong with an axis of elongation 1132 that is not parallel to either one of the $x_b$- and $y_b$-axes. This asymmetric beam shape arises for reasons similar to those discussed above for combiner 100 (see FIGS. 3 and 4), in combination with grating 1020 being oblique to the center rays of incident beam 170 in the horizontal, non-diffractive plane. Although the divergence angles are symmetric again after grating 1030, the deformed beam shape at grating 1030 leads to astigmatism, for reasons similar to those discussed above for combiner 100. In combiner 1000, the astigmatism may be at least partly corrected by reducing $\alpha_2$ as compared to $\alpha_1$. For example, $\alpha_2$ may be set to $0.5\alpha_1$. This correction takes place in the non-diffractive dimension and does not adversely impact beam combination.

In the example depicted in FIG. 10, the reflective surface of grating 1020 faces obliquely upwards (in the positive z-direction), and the reflective surface of grating 1030 faces obliquely downwards (in the negative z-direction). Alternatively, the reflective surface of grating 1020 faces obliquely downwards and the reflective surface of grating 1030 faces obliquely upwards.

Figure 12:
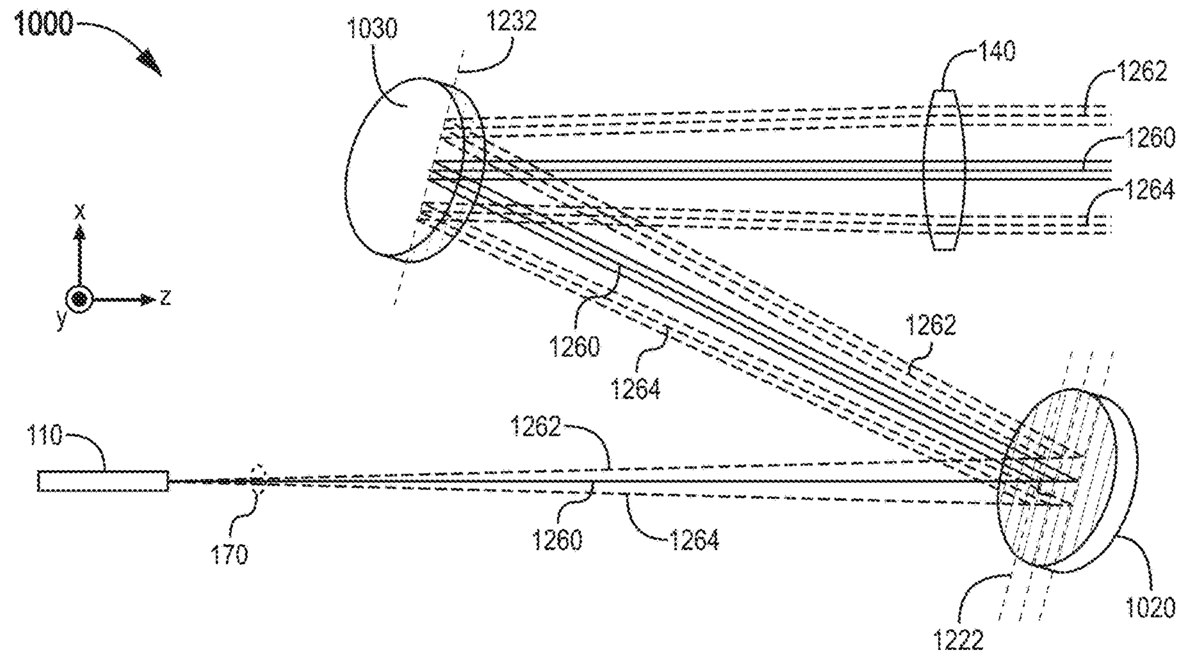
FIG. 12 is a top view of the dual-grating spectral beam combiner of FIG. 10 showing the propagation of center rays and peripheral rays of three laser beams in the plane of non-diffractive deflection.

FIG. 12 is a top view of combiner 1000 showing the propagation of center rays 1260 and peripheral rays 1262 and 1264 of three beams 170 in the plane of non-diffractive deflection, i.e., in the horizontal plane. Initially, before reaching grating 1020, all beams 170 are only vertically offset from each other. There is no horizontal offset, and the different beams 170 are therefore indistinguishable in FIG. 12. (For simplicity, any longitudinal offsets between sources 110 are ignored here.) Due to the vertical offset between beams 170 and the fact that grating 1020 faces obliquely upwards, center rays 1260 of different beams 170 reach grating 1020 at different z-axis locations. Three offset guides 1222 are depicted on the drawing. The bottom-most beam 170, reaches grating 1020 first, and the top-most beam 170 reaches grating 1020 last. Beams 170 are therefore horizontally offset from each other when propagating toward grating 1030. In FIG. 12, the different center rays 1260, different peripheral rays 1262, and different peripheral rays 1264 are clearly distinguishable from each other. (Only a single beam 170 is labeled in FIG. 12.) Because center rays 1260 of beams 170 reach grating 1030 at the same vertical location, see guide 1232, the horizontal offset persists after grating 1030, resulting in a combination error. The error may be decreased by reducing deflection angle $\alpha_1$, if possible. In some scenarios, the combination error may be negligible compared to the size of the combined beam.

Figure 13:
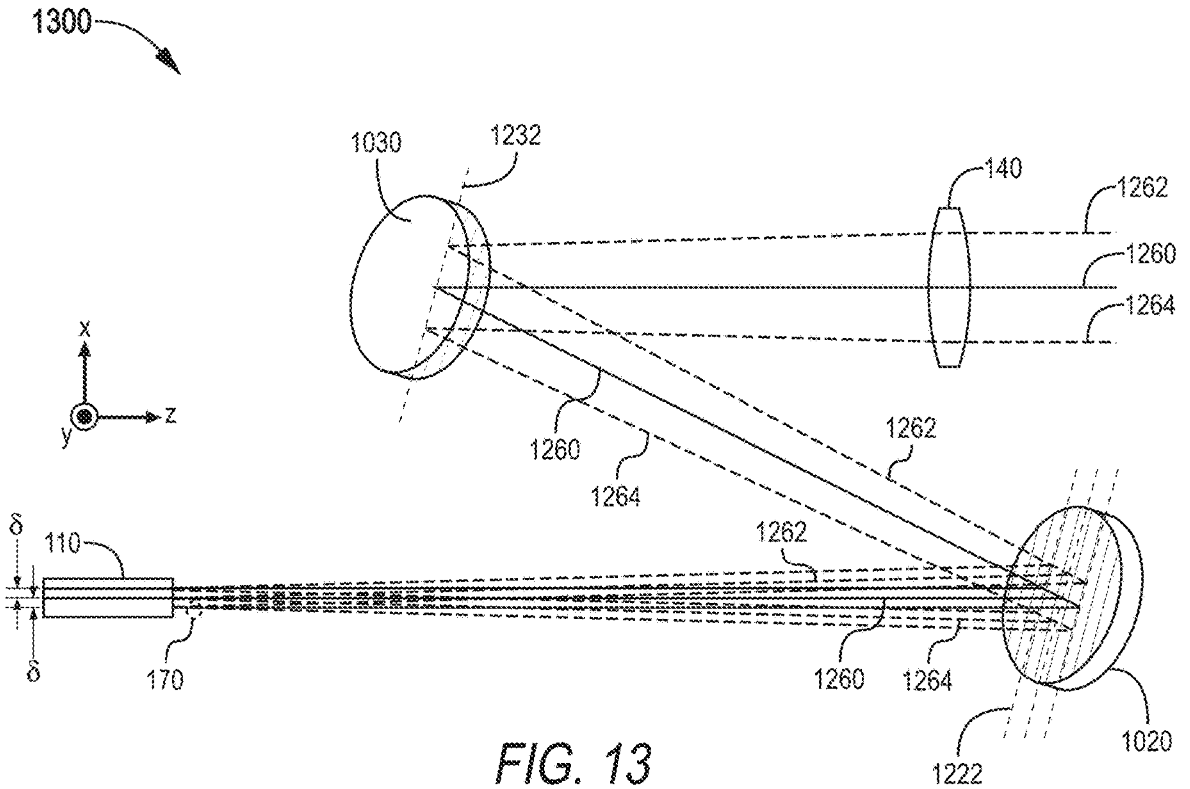
FIG. 13 is a top view of a dual-grating spectral beam combiner that avoids a combination error illustrated in FIG. 12, according to an embodiment.

FIG. 13 is a top view of one dual-grating spectral beam combiner 1300 that avoids the combination error illustrated in FIG. 12. Combiner 1300 is a modification of combiner 1200, wherein sources 110 are horizontally offset from each other by transverse horizontal offsets δ. Different pairs of adjacent sources 110 may have different respective offsets δ. The ideal offset value depends on the vertical offsets between sources 110 as well as the orientation of grating 1020. When propagating toward grating 1020, beams 170 are horizontally offset from each other. As depicted, transverse horizontal offsets δ may be set such that grating 1020 eliminates the horizontal offsets between beams 170.

Figure 14:
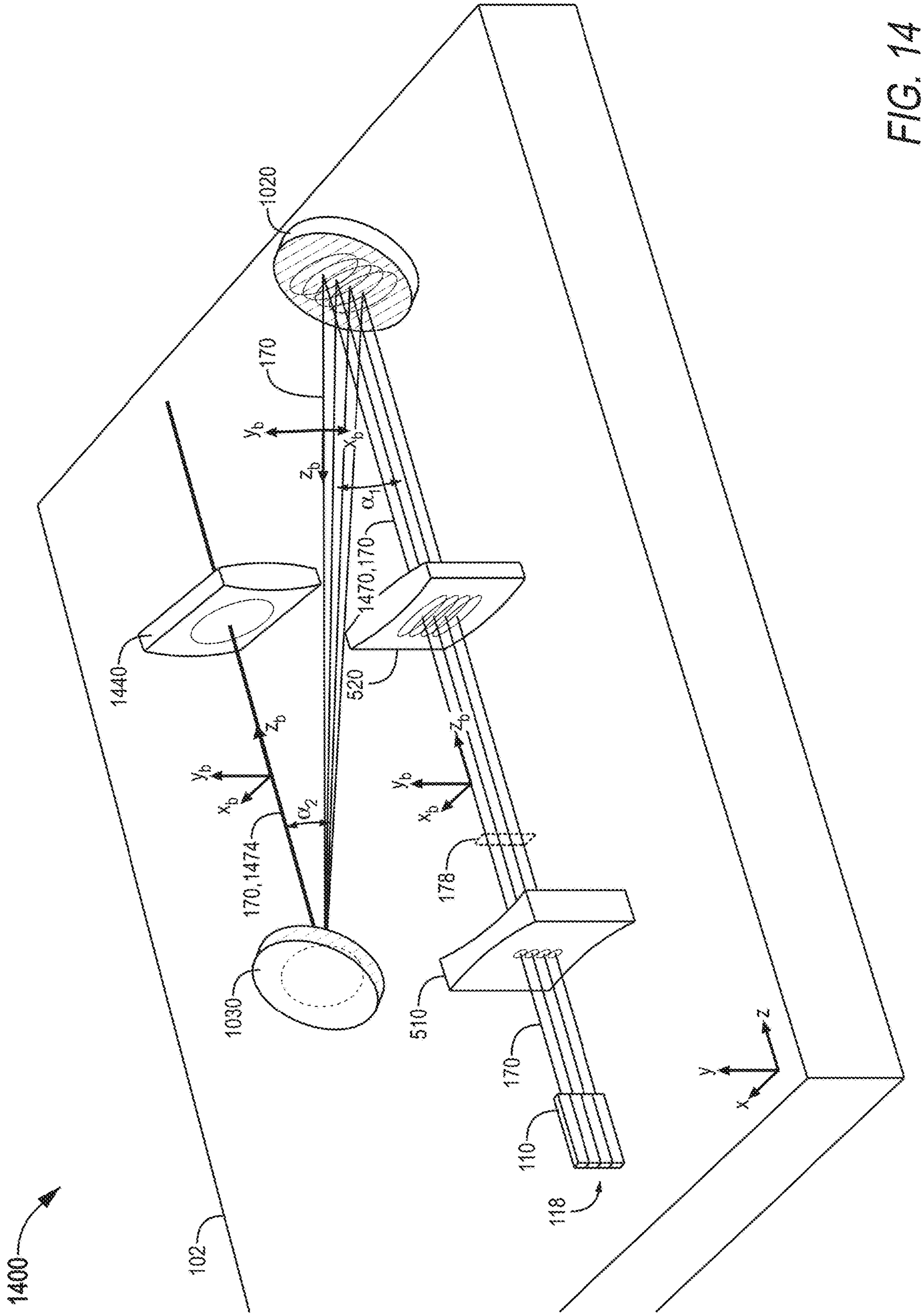
FIG. 14 illustrates yet another dual-grating spectral beam combiner that uses reflection gratings to combine diverging laser beams, according to an embodiment. This dual-grating spectral beam combiner implements pre-diffraction collimation of a transverse beam dimension that is orthogonal to the plane of diffraction.

FIG. 14 illustrates yet another dual-grating spectral beam combiner 1400 that uses reflection gratings to combine diverging laser beams 170. Combiner 1400 implements pre-diffraction collimation of a transverse beam dimension that is orthogonal to the plane of diffraction. As in combiner 1000, the gratings deflect the beams in a plane that is orthogonal to the plane of diffraction. Combiner 1400 is a modification of combiner 1000 that implements (a) pre-diffraction collimation of the horizontal transverse dimension of each beam 170 and (b) replaces collimator 140 with a one-dimensional collimator 1440, e.g., a cylindrical lens or mirror, that collimates the vertical transverse dimension of the combined beam.

In the depicted embodiment, combiner 1400 implements pre-diffraction collimation scheme 500. Alternatively, combiner 1400 may implement another pre-diffraction collimation scheme, for example scheme 600 or 700. In one embodiment, sources 110 are longitudinally offset from each other, as discussed for sources 110 of combiner 100 in reference to FIGS. 2A and 2B, and combiner 1400 implements scheme 700. Pre-diffraction collimation of beams 170 produces beams 1470 that are horizontally collimated and vertically diverging. Diffraction by gratings 1020 and 1030 produces a combined beam 1474 that is horizontally collimated and vertically diverging. Collimator 1440 collimates the vertical dimension of combined beam 1474. Horizontal pre-diffraction collimation of beams 170 eliminates the astigmatism discussed above in reference to FIGS. 10 and 11.

Combiner 1400 is subject to the beam combination errors afflicting combiner 1000, as discussed above in reference to FIG. 12. The combination errors may be eliminated by horizontally offsetting beams 1470. This is particularly simple to achieve in embodiments of combiner 1400 that implement pre-diffraction collimation scheme 700. In such embodiments, each source 110 and its associated collimation lens 730 may be horizontally offset from adjacent source-collimation lens pair(s) by a small amount, such that beams 1470 emerge from common collimation lens 720 with mutually parallel but horizontally offset center rays.

Without departing from the scope hereof, any one of the combiners discussed above may include one or more folding mirrors that fold the beam propagation paths, for example for the purpose of reducing overall dimensions of the combiner. Also, without departing from the scope hereof, collimator 140 may be replaced by one or more lenses and/or mirror that focus rather than collimate the combined beam.

The present invention is described above in terms of a preferred embodiment and other embodiments. The invention is not limited, however, to the embodiments described and depicted herein. Rather, the invention is limited only by the claims appended hereto.

What is claimed is:

1. A dual-grating spectral beam combiner, comprising:

a series of sources configured to emit a respective series of diverging laser beams with mutually parallel center rays offset from each other in a one-dimensional array, each diverging laser beam having a respective center wavelength, the center wavelengths being incremented monotonically across the array;

a first diffraction grating arranged to receive the diverging laser beams from the sources and diffract the diverging laser beams into an n'th diffraction order, with respect to the first diffraction grating, so as to form respective once-diffracted diverging beams with mutually converging center rays; and a second diffraction grating positioned where the center rays of the once-diffracted diverging beams coincide, the second diffraction grating being arranged to diffract the once diffracted diverging beams into an m'th diffraction order, with respect to the second diffraction grating, so as to form a single combined diverging laser beam consisting of twice diffracted diverging beams with mutually parallel center rays.

2. The dual-grating spectral beam combiner of claim 1, further comprising a post-diffraction collimator for collimating the combined diverging laser beam.

3. The dual-grating spectral beam combiner of claim 1, wherein grating lines of the second diffraction grating are parallel to grating lines of the first diffraction grating.

4. The dual-grating spectral beam combiner of claim 3, wherein the first and second diffraction gratings are parallel to each other.

5. The dual-grating spectral beam combiner of claim 1, wherein each of the n'th diffraction order of the first diffraction grating and the m'th diffraction order of the second diffraction grating is a first diffraction order, and periodicity of grating lines of the first diffraction grating equals periodicity of grating lines of the second diffraction grating.

6. The dual-grating spectral beam combiner of claim 1, wherein each source is an optical fiber or a fiber terminator.

7. The dual-grating spectral beam combiner of claim 1, wherein at least one transverse dimension of each of the diverging laser beams is at least one centimeter when incident on the second diffraction grating.

8. The dual-grating spectral beam combiner of claim 1, wherein at least one of the sources is longitudinally offset from other ones of the sources so as to at least partly equalize, between the diverging laser beams, respective propagation distances from the sources to the second diffraction grating.

9. The dual-grating spectral beam combiner of claim 1, wherein the first and second diffraction gratings are oriented at Littrow angle for a wavelength that is within a wavelength range spanned by the diverging laser beams.

10. The dual-grating spectral beam combiner of claim 1, wherein the diverging laser beams diverge in two orthogonal transverse dimensions when incident on the first diffraction grating, and further comprising a post-diffraction collimator configured to collimate the combined diverging laser beam in the two orthogonal transverse dimensions.

11. The dual-grating spectral beam combiner of claim 1, wherein each of the diverging laser beams has a divergence angle of at least 3 milliradians full-angle.

12. The dual-grating spectral beam combiner of claim 1, wherein the array of center rays is horizontal when incident on the first diffraction grating, the first and second diffraction gratings are transmission gratings with vertical grating lines, and respective normal vectors of the first and second diffraction gratings are horizontal.

13. The dual-grating spectral beam combiner of claim 12, wherein the diverging laser beams diverge in two orthogonal transverse dimensions when incident on the first diffraction grating, and a normal vector of the second diffraction grating is at a non-zero angle to a normal vector of the first diffraction grating, the non-zero angle being between 0.5 and 6 degrees.

14. The dual-grating spectral beam combiner of claim 12, further comprising:

a pre-diffraction collimation module positioned between the sources and the first diffraction grating and configured to expand and then collimate a first transverse dimension of each of the diverging laser beams, the first transverse dimension being vertical when the diverging laser beams are incident on the first diffraction grating; and a post-diffraction collimator configured to collimate a second transverse dimension of the combined diverging laser beam, the second transverse dimension being orthogonal to the first transverse dimension.

15. The dual-grating spectral beam combiner of claim 14, wherein at least one of the sources is longitudinally offset from other ones of the sources, and the pre-diffraction collimation module includes:

a plurality of cylindrical collimation lenses each configured to collimate the first transverse dimension of a respective subset of the series of diverging laser beams;

a first cylindrical lens that is common to all the diverging laser beams and configured to expand the first transverse dimension of the diverging laser beams as received from the cylindrical collimation lenses; and a second cylindrical lens that is common to all the diverging laser beams and configured to collimate the first transverse dimension of the diverging laser beams as received from the first cylindrical lens.

16. The dual-grating spectral beam combiner of claim 1, wherein the array of center rays is horizontal when incident on the first diffraction grating, the first and second diffraction gratings are reflection gratings with vertical grating lines, and normal vectors of the first and second diffraction gratings are horizontal.

17. The dual-grating spectral beam combiner of claim 16, further comprising:

at least one pre-diffraction collimation module positioned between the sources and the first diffraction grating and configured to expand and then collimate a first transverse dimension of each of the diverging laser beams, the first transverse dimension being vertical when the diverging laser beams are incident on the first diffraction grating; and a post-diffraction collimator configured to collimate a second transverse dimension of the combined diverging laser beam, the second transverse dimension being orthogonal to the first transverse dimension.

18. The dual-grating spectral beam combiner of claim 1, wherein the first and second diffraction gratings are reflection gratings with horizontal grating lines, respective normal vectors of the first and second diffraction gratings are oriented at an oblique angle to a horizontal plane, and projections of the normal vectors onto the horizontal plane are oriented at an oblique angle to the center rays of the diverging laser beams as incident on the first diffraction grating.

19. The dual-grating spectral beam combiner of claim 18, wherein the array of center rays is vertical when incident the second diffraction grating, and the center rays are both vertically and horizontally offset from each other when incident on the first diffraction grating.

20. The dual-grating spectral beam combiner of claim 18, wherein:

the diverging laser beams diverge in two orthogonal transverse dimensions when incident on the first diffraction grating; and an angle, in the horizontal plane, between the once-diffracted diverging beams and the twice-diffracted diverging beams at the second diffraction grating is less than an angle, in the horizontal plane, between the diverging laser beams and the once-diffracted diverging beams at the first diffraction grating.

21. The dual-grating spectral beam combiner of claim 18, further comprising:

at least one pre-diffraction collimation module positioned between the sources and the first diffraction grating and configured to expand and then collimate a first transverse dimension of each of the diverging laser beams, the first transverse dimension being horizontal when the diverging laser beams are incident on the first diffraction grating; and a post-diffraction collimator configured to collimate a second transverse dimension of the combined diverging laser beam, the second transverse dimension being orthogonal to the first transverse dimension.

* * * * *